Patented Mar. 30, 1948

2,438,855

UNITED STATES PATENT OFFICE 2,438,855

PROCESS OF MODIFYING STARCH

Ralph W. Kerr, Riverside, and Norbert F. Schink, Oak Park, Ill., assignors to Corn Products Refining Company, New York, N. Y., a corporation of New Jersey No Drawing. Application February 25, 1942, Serial No. 432,248

8 Claims. (Cl. 260—209)

This invention relates to the treatment of tapioca starch, or other root starch (in distinction to the cereal starches, such as corn starch), for the production of a gelatinizable paste intended for use as an ingredient of certain food products, for example in pies, where it may be used as a filler to give body and consistency to the pie filling, or in jelly-like puddings of the type known as Danish desserts, where the treated starch takes the place of gelatin.

In order that starch may be used satisfactorily in food products of the type above indicated, it must meet the following requirements: (1) It must be capable of being cooked, when mixed with the other ingredients of the food product, e. g. with the other ingredients of the pie filling or Danish dessert, to a paste which, when hot, will have sufficient consistency or strength so that it will stand up and not collapse. The hot paste consistency of a modified starch is usually measured by the Scott test, to be hereinafter described; and the Scott range for the product of the present invention is approximately between 30 and 200. The higher the index number on the Scott scale the greater the viscosity, that is, the body or consistency. (2) The paste, on cooling, must gelatinize to a consistency which is neither semi-fluid nor too stiff. The cold paste consistency or viscosity is usually measured by the Stormer test, to be hereinafter described; and the Stormer index numbers of the products of the present invention are approximately within the range of 5 to 60. The higher the Stormer number, the greater the viscosity. (3) The gel should be transparent, clear and brilliant and not cloudy. It should approximate the clarity of gelatin gels. (4) The gel must be short and not stringy. But it must not be so short as to be crumbly. It should cleave easily without crumbling and should have a jelly-like feel in the mouth. (5) The gel must be smooth and not lumpy. (6) It should be tasteless.

The requirements as to clarity, smoothness of the gel, and tastelessness are fulfilled by the use of untreated tapioca starch when cooked to a paste and allowed to cool. But the hot paste viscosity (Scott) and the cold paste viscosity, or gel viscosity (Stormer) are much too high. Furthermore, the gel is stringy and not short.

The primary object of the present invention is to treat tapioca starch (or other root starch), but more particularly tapioca starch, so as to reduce its Scott and Stormer indexes and convert the natural stringiness of its gel to a desirable degree of shortness; and to accomplish this without detrimentally affecting the natural good qualities of the tapioca starch gel, that is, its clarity, smoothness and tastelessness. The products which have been produced in accordance with this invention are, it is believed, superior to all known starch products intended for the uses above indicated. That is, they meet all requirements, adequately, while starch products heretofore used for these purposes are deficient in respect to one or more of such requirements.

The extent to which the Scott and Stormers are lowered, in accordance with the present invention, will depend upon the particular use to which the treated starch is to be put. For example, puddings of the Danish dessert type usually contain tartaric or other acids to give the food product a tart taste. An acid such as this tends to bring about the thinning of the starch when cooked, so that its presence may result in hot pastes and gels which lack consistency and body. To compensate for this, the present invention contemplates a treatment of the starch, for Danish desserts, to make it more resistant to acids than the modified starch intended, according to this invention, for use as a pie filler; and to accomplish this without too great reduction in Scotts and Stormers. For Danish desserts the Scotts of the starches, modified in accordance with this invention, will ordinarily be within the range of 30–40 and the Stormers within the range of 5–10. For the modified starches of the present invention intended for use as pie fillings the Scotts will usually be between 100 and 200. However, these ranges are only illustrative and preferential and do not involve any difference in the fundamental principles of the invention. In all cases, and regardless of the requirements for particular uses, the tapioca or other root starch is treated so as to substantially reduce its hot paste and cold paste viscosities and to change the natural stringiness of its gel to a moderate shortness by a treatment or treatments of the starch, whereby the capacity of the starch when cooked to form a gelatinizable paste is not destroyed, whereby the natural transparency, clarity, brilliance and smoothness of the gel are not impaired, and whereby no undesirable taste is imparted to the food product in which the modified starch is to be used.

The desired effects, applicants have discovered, can be brought about by treating a water suspension of the starch preferably at temperatures somewhat above room temperature with small amounts of formaldehyde or acetaldehyde, in the presence of small amounts of an acid, preferably a mineral acid. The acid tends to thin the starch, thus decreasing the Scott and Stormer figures. That is, the acid tends to cause the starch granules to become tenderized so that when cooked, the granules have an increased tendency to burst, and this results in thinner hot and cold pastes. The acid also acts as an accelerator of the reaction between the aldehyde and the starch. The aldehyde reaction brings about a toughening of the starch granules and this results in increasing the shortness of the gel. That is, the natural stringiness of the tapioca starch gel is changed to the desired degree of shortness. The toughening of the starch granules by the aldehyde treatment also makes them less susceptible to swelling and bursting when the starch is cooked. It would appear, therefore, that the ultimate thinning of the starch is the result of a partially balanced effect as between the thinning action of the acid and the thickening action of the aldehyde. The thickening action of the aldehyde is incidental to its function of decreasing stringiness. The primary purpose of the aldehyde treatment is to give the gel the proper degree of shortness.

There must be close control both of the hydrolyzing reaction, as between acid and starch, and of the condensing action of the aldehyde on the starch.

The amount of aldehyde should be as small as possible so as to minimize the quantity of this non-starch substance in the final product. The intention is, of course, to remove from the starch all reaction chemicals.

The degree of the aldehyde-starch reaction depends upon two factors, viz.: the amount of aldehyde and the pH of the starch suspension.

If the reaction of the aldehyde and the starch is excessive, then the finished starch will have both Scott and Stormers too low, and it will be excessively short. Excessive reaction between aldehyde and starch may result from either too much aldehyde or from causing the same amount of aldehyde to react excessively with the starch due to too low a pH. An excessive aldehyde reaction may toughen the starch granules to such an extent that when the starch is pasted, the granules will undergo only a minor degree, if any, of swelling or gelatinization. Under these circumstances the Scotts and Stormers will be too low. That is, under these conditions the aldehyde will have a thinning instead of a thickening effect.

With an adequate amount of aldehyde present an excessively low pH will cause the aldehyde reaction to predominate over the hydrolyzing action of the acid on the starch.

An insufficient degree of the aldehyde-starch reaction will produce a starch which is too stringy and the Scott and Stormers of which are too low. In such case, the low Scotts and Stormers are due to the hydrolyzing effect of the acid which predominates over the aldehyde reaction.

If the pH is excessively high, the aldehyde-starch reaction will not be sufficiently accelerated to give a starch of proper shortness. Too high pH's will also prevent sufficient lowering of the Scott and Stormer of the raw starch necessary in order to effect the purposes of this invention.

Practical ranges of pH and aldehyde quantities, having in view the type of starch to be modified, the particular aldehyde used, and the characteristics desired in the product to be produced, will be given in connection with the specific examples to follow. Generally speaking, and without imposing these particulars as limitations on the invention, the pH range is about 1.6–2.5; while the aldehyde quantities may vary (using round numbers) from about 0.075% to 0.5%, by weight (dry substance in the case of formaldehyde), on the dry substance starch treated.

From the principles of operation expressed above, those skilled in the art will be able to utilize this invention successfully in operations which may differ, from those specifically described hereinafter, for example, in respect to the kind of starch treated, the kind of aldehyde used, and the particular characteristics desired in the final product.

Depending upon the characteristics of the starch treated, upon the desired characteristics of the product and upon the particular aldehyde used, the starch milk may or may not be given a preliminary treatment with the acid alone, that is, before its treatment with the aldehyde and acid together. This preliminary acid treatment tends to reduce the Scott and Stormer of the product.

Theoretically any water soluble starch reactive aliphatic aldehyde can be used. Experience shows that propionaldehyde and butyraldehyde may be used with effects similar to those produced by formaldehyde and acetaldehyde. However, in practice their use is questionable because of the tendency of these agents to give the product objectionable tastes and odors.

The acid used is preferably dilute sulfuric acid. In place of sulfuric acid one may use any of the acids commonly used for thinning starch, such as hydrochloric acid or nitric acid. Acid salts may be used or any acidic material or combination of acidic materials capable of giving the required pH's. Examples of acid salts are ammonium chloride and potassium bisulfate.

When the aldehyde treatment has been carried far enough, the acid in the starch milk is neutralized with soda ash or other suitable neutralizing agent, and sodium bisulfite, or its equivalent, is added to stop the reaction between the aldehyde and the starch. The sodium bisulfite forms an addition product with the formaldehyde or acetaldehyde, which is water soluble and can be removed completely from the starch by filtering and washing. In place of sodium bisulfite any water soluble sulfite material may be used, such as potassium bisulfite, sodium sulfite, potassium sulfite, ammonium bisulfite, and ammonium sulfite. In place of soda ash one may employ any neutralizing agent commonly used for neutralizing acids in starch suspensions, for example, caustic soda, ammonia or potash. The starch milk is then filtered, the filter cake re-suspended in fresh water, the pH of the suspension adjusted by adding soda ash or sodium hydroxide to neutralize any excess of acid, and to compensate, if desired, for acids in the food product for which the starch is intended. This will be followed by filtering and drying.

By these operations the aldehyde is completely removed from the starch.

Before specifying examples illustrative of the invention descriptions of the Scott and Stormer tests will be given as follows:

Scott test for thick boiling starches 15 grams of 12% moisture starch to be tested is mixed with 280 cc. of distilled water at room temperature. The beaker containing the mixture is put into a boiling water bath and stirred constantly for five minutes by means of a mechanical agitator rotating at 200 revolutions per minute. At the end of five minutes the beaker is covered with a watch glass and the contents allowed to boil for another period of five minutes. At the end of ten minutes the watch glass is removed, the condensate is drained back and the material stirred, at the above rate, the draining and stirring taking ten seconds. The watch glass is put back on the beaker and the mixture allowed to boil for one minute and fifty seconds or until twelve minutes time has elapsed. The watch glass is removed, the condensate is drained back into the beaker and the contents stirred, these operations taking fifteen seconds. At the end of twelve minutes and fifteen seconds, elapsed time, the contents of the beaker is transferred to a Scott cup, described below, and at the end of fifteen minutes, total elapsed time, the plunger valve of the cup is withdrawn, allowing the paste to pass into a graduated cylinder arranged below the cup. The Scott index for any given paste is the number of seconds required for the delivery of 50 cc. of the starch paste from the cup. The Scott cup is a cup or funnel having a discharge tube in the bottom about 3.175 mm. long with an orifice about 1.588 mm. in diameter which is closed by a plunger valve. The orifice is adjusted as to the diameter on the basis of a master cup. The average commercially made, non-modified corn starch, when tested as above, has a Scott between 85 and 90.

The Stormer test for thick boiling starches

A cold starch gel is measured for viscosity by what is known as the Stormer test. This test is made by cooking 15 grams of the starch with 280 grams of water, cooling the paste to 77° F. and then determining the number of seconds that it requires for a cylinder weighing 55 grams, having a diameter of 31.75 mm. and a length of 34.93 mm. to make 50 revolutions within the paste when the cylinder is forced to rotate by a 400 gram weight.

In both the Scott and Stormer tests the higher the index number, the greater will be the hot paste or cold paste viscosity, as the case may be.

Both the Scott and Stormer of tapioca starch are much higher than those of corn starch for example. The difference is so great that one cannot use the ordinary 15 gram Scott and Stormer tests, as just described, for determining hot and cold paste viscosities of tapioca starch. By reducing the starch concentration of the paste to 10 grams and for the Stormer also reducing the weight from 400 to 75 grams, a comparison is possible. Under these conditions raw corn starch gives a 10 gram Scott of 18 and a 10 gram Stormer of 128. Tapioca starch under the same conditions will have a 10 gram Scott of about 50 and a 10 gram Stormer of 280.

The following are specific examples of reductions to practice of the present invention. It will be understood that these examples are merely typical and illustrative. The invention is not to be considered as limited to the particular operating data given. The intention is to cover all equivalents. It is also the intention to cover all modifications within the scope of the hereto appended claims.

The examples all illustrate a common principle of procedure, viz., the treatment of a root starch with an aldehyde and with a hydrolyzing acid to reduce hot and cold paste viscosities of the starch and to effect a change in the character of the starch whereby its gel will be short instead of stringy but not short enough to be crumbly; and to accomplish these results without interfering with the capacity of the starch to cook to a gelatinizable paste, without giving an objectionable taste or odor to the modified starch and without interfering with the clarity of the paste natural to starches of this type.

In the specific examples ranges will be given in parentheses. These ranges are practical, not critical, unless specified. The proportions are by weight.

Example No. 1.—Tapioca starch: formaldehyde

To a 22° Baumé tapioca starch milk (20° Baumé to 24° Baumé, the Baumé adopted being merely a matter of convenience and economical operation) is added enough dilute sulfuric acid to give the suspension a pH of 1.6 (1.6–2.0). The suspension is heated at 100° F. (100°–105° F.) for six hours (4–8 hours). There is then added to the suspension 0.194% (0.155%–0.233%) of dry substance formaldehyde based on the dry substance starch. The suspension is heated at 100° F. (100°–105° F.) for sixteen hours (12–20 hours). The material is then neutralized with soda ash to a pH of 6.0 (5.8–6.5), the liquid filtered from the solids and the filter cake re-suspended in fresh water at 115° F. to make a 12° Baumé suspension. To this is added 0.42% sodium bisulfite based on the dry substance starch (0.2%–0.5%); or in any event enough sodium bisulfite to react with all of the free formaldehyde. The suspension is stirred for 75 minutes (60–90 minutes) and is filtered so as to remove the reaction products of the sodium bisulfite and formaldehyde. The filter cake is re-suspended in fresh water at 125° F. to a Baumé of 12° and the pH adjusted to 6.2 (6.0–6.5) by adding soda ash or caustic soda to the suspension. The modified starch is filtered from the suspension and dried.

If the operating data, as given above, are followed, the product will have a 15 gram Scott of 118 (100–125) and a 15 gram Stormer, using a 400 gram weight, of 39 (25–60). The hot paste consistency will be such that the starch can be used as a pie filler or in puddings of the Danish dessert type. The gel will be short, not stringy, but with a moderate shortness evidenced by readiness to cleave without crumbling. That is, the paste when cooled will have a jelly-like consistency. The gel will possess a transparency, clarity and brilliance closely approximating gelatin gels. The gel will be smooth, not lumpy, and will have no appreciable taste when used as indicated.

Example No. 2.—Sweet potato starch: formaldehyde

Sweet potato starch, like tapioca starch and other root starches, in an unmodified state, forms a gelatinizable paste, when cooked, which has Scott and Stormer indexes too high for the purposes of this invention. The gel is also deficient in shortness, that is, it is stringy. However, these divergencies from the requirements of the present invention are not as great as in the case of tapioca starch. Hence the treatment of potato starch has to be somewhat different from the treatment of tapioca starch, in order to obtain equivalent results. Particularly, the preliminary treatment with acid alone is omitted.

The process may be as follows: to a 22° Baumé sweet potato starch milk is added 0.116% (0.077%–0.155%) of dry substance formaldehyde, in the form of a 40% solution, based on the dry substance starch, and enough sulfuric acid to give the suspension a pH of 1.6 (1.6–2.0). The suspension is heated for three and three-quarters hours (3–6 hours) at 100° F. (100°–105° F.). The suspension is then neutralized with soda ash to 6.6 pH (6.2–6.8) and filtered. The filter cake is re-suspended in water at 115° F. to give a 12° Baumé suspension. 0.25% of sodium bisulfite, based on the dry substance starch (0.2%–0.4%), or enough to react with all of the free formaldehyde, is added to the suspension, and the latter is stirred for 75 minutes (60–90 minutes). The material is filtered, the filter cake re-suspended in fresh warm water, and the pH adjusted to 6.6 (6.2–6.8). The suspension is then filtered and the starch dried in any suitable manner.

Assuming the preferred operating data as given above, the product will have a 15 gram Scott of 103, or thereabouts, and a 15 gram Stormer, using a 400 gram weight, of 25. The gel will be sufficiently short for the purposes of this invention and the clarity of the gel fair, although not as good, perhaps, as the gels from tapioca starch in accordance with Example 1.

*Example No. 3.—Tapioca starch: acetaldehyde*

This example is intended to illustrate, particularly, a tapioca starch modified by acetaldehyde under conditions making it particularly suitable for use as a pie filler.

To a 22° Baumé (20°–24° Baumé) tapioca starch milk is added dilute sulfuric acid to give the suspension a pH of 2.3 (2.0–2.5) and 0.32% (0.25%–0.335%) of acetaldehyde by weight on dry substance starch. The conversion is carried on for thirteen hours (10–16 hours) at 85° F. (80°–90° F.). The material is then neutralized with soda ash to a pH of 6.5 (6.3–6.7), the water filtered off and the filter cake re-suspended in warm water to form a 12° Baumé suspension. To this is added enough sodium bisulfite to react with the free acetaldehyde, that is to say, about 0.32% of sodium bisulfite based on dry substance starch (0.25%–0.4%). The temperature is raised to 100° F. and the suspension stirred for two hours. The water is then filtered off from the solids, the filter cake re-suspended in warm water to form a suspension of 12° Baumé, and the pH adjusted to 6.5 (6.3–7.0) by adding soda ash or caustic soda. The water is filtered off from the modified starch and the starch dried in any suitable manner.

Using the preferred operating data as indicated above the product will have a 15 gram Scott of about 188 and a 15 gram Stormer, using a 400 gram weight, of about 27. The product is fully as good as, if not better than, the formaldehyde product of Example No. 1, in respect to clarity, shortness, tastelessness and smoothness of the gel.

*Example No. 4.—Tapioca starch: acetaldehyde*

This example gives a procedure intended particularly for a modified starch product to be used in puddings of the Danish dessert type, or under similar conditions. These puddings usually contain tartaric, or other edible acid, and the acid, when the starch is cooked, has a thinning effect on the starch. According to the present example, the thinning effect on the starch of the edible acid is compensated by giving the starch a somewhat more severe aldehyde treatment than is used for modifying starch for pie fillers, whereby the starch granules are toughened and, therefore, are made less susceptible to the action of the tartaric or other acid in the cooking operation. The more severe aldehyde treatment results in lower Scotts and Stormers, for reasons stated above, but they are still within proper and workable ranges. That is, in this case, the aldehyde treatment is carried to a point at which, incidentally, it thins the starch instead of thickening it.

To a 22° Baumé tapioca starch is added dilute sulfuric acid to give the suspension a pH of 1.8 (1.6–2.0). The suspension is heated for one hour (½ to 2 hours) at 120° F. (115°–125° F.). To this thinned starch milk is added 0.419% (0.377%–0.503%) of acetaldehyde based on dry substance starch and the material converted for sixteen hours (14–18 hours) at 120° F. (115°–125° F.). The material is then neutralized by soda ash to 6.0 pH (5.5–6.5), filtered, the filter cake re-suspended in warm water to form a 12° Baumé suspension, and 0.52% (0.4% to 0.65%) of sodium bisulfite on the dry substance starch added, or such quantity as may be necessary to react with all of the free acetaldehyde. The suspension is stirred for two hours, filtered and the filter cake re-suspended in warm water to form a 12° Baumé suspension. The pH is then adjusted to 6.5 (6.3–7.0) by adding soda ash or caustic soda. The liquid is filtered from the modified starch and the latter dried in any suitable manner.

The product following the specific operating data given above has a 15 gram Scott of 35 and a 15 gram Stormer, using 400 gram weight, of 5. By operating within the limits indicated, the Scott may vary from 30 to 40 and the Stormer from 5 to 10.

It will be observed that in these examples the 15 gram Scott indexes range from (in round numbers) 30–200, while the 15 gram Stormers, using a 400 gram weight, range from 5–60.

*Example No. 5.—Lemon pie using acetaldehyde modified tapioca starch of Example No. 3*

The lemon pie filling may be made up of the following ingredients in proportions by weight as follows:

| | Parts |
|---|---|
| Sugar | 400 |
| Acetaldehyde modified tapioca starch of Example No. 3 | 68 |
| Egg yolks | 60 |
| Butter | 20 |
| Lemon juice | 100 |
| Water | 640 |

480 parts of the water may be used for dissolving the sugar and 160 parts for cooking up the modified starch.

The ingredients are cooked in a steam jacketed kettle until uniform composition is obtained. While still hot, the mix from the kettle is applied to the pies as a filling.

The filling so produced is satisfactory from the point of view of hot paste consistency, shortness and clarity of the cooled filling. These results are accomplished by the use of about 15% less of the modified starch than is necessary, to obtain the requisite consistencies, if known starch pie fillers are used.

*Example No. 6.—Cherry pie using acetaldehyde modified tapioca starch of Example No. 3*

The pie filling may be composed of the following ingredients by weight as follows:

| | Parts |
|---|---|
| Cherry juice from canned cherries | 150 |
| Cane sugar | 120 |
| Acetaldehyde modified starch of Example No. 3 | 20 |
| Whole cherries | 454 |

The starch and sugar are blended, the cherry juice added, and the mix cooked in a steam jacketed kettle. The cherries are then added and the pies filled with the filling thus produced.

It will be understood the recipes given as Examples No. 5 and No. 6 are purely illustrative and typical.

*Example No. 7.—Danish dessert using acetaldehyde modified starch of Example No. 4*

A ready-to-use Danish dessert powder may be composed of the following ingredients in proportion by weight as follows:

| | Parts |
|---|---|
| Acetaldehyde modified starch of Example No. 4 | 27 |
| Anhydrous dextrose | 14.11 |
| Cane sugar | 57.13 |
| Salt | 0.42 |
| Tartaric acid | 1.21 |
| Raspberry flavor | 0.13 |

Here again the suggested composition is merely typical and illustrative. Modifications will suggest themselves to those skilled in the art. In the place of tartaric acid other edible acids capable of giving the dessert tartness may be used, for example lactic acid and hydroxyacetic acid. In place of the raspberry fruit flavor, other fruit flavors such as loganberry, strawberry and red currant may be used.

The above described dessert powder may be made into a pudding by mixing one part of the powder, by weight, with 3.7 parts of water, heating the mixture to a boil, cooking for four minutes and then placing in a refrigerator for three hours.

The dessert in transparency, brilliance and clarity, as well as in other respects, will compare favorably with Danish desserts made with gelatin.

We claim:

1. Process of modifying a root starch which comprises: treating the starch in a water suspension with an amount of acid to give the suspension a pH of about 1.6 to 2.5, and with about 0.075% to 0.5% of an aldehyde selected from the group consisting of formaldehyde and acetaldehyde, at a temperature not exceeding the gelatinization temperature of the starch for a period of about 3 to about 28 hours; neutralizing the acid; treating the suspension with a water soluble sulfite material selected from the group of substances consisting of sodium bisulfite, potassium bisulfite, sodium sulfite, potassium sulfite, ammonium bisulfite and ammonium sulfite to react with the free aldehyde; and separating the resultant modified starch therefrom.

2. Process of modifying a root starch which comprises: treating the starch in a water suspension with an amount of acid to give the suspension a pH of about 1.6 to 2.5, and with about 0.075% to 0.5% of an aldehyde selected from the group consisting of formaldehyde and acetaldehyde, at a temperature between about 80° F. and about 125° F. for a period of about 3 to 28 hours; neutralizing the acid; treating the suspension with a water soluble sulfite material selected from the group of substances consisting of sodium bisulfite, potassium bisulfite, sodium sulfite, potassium sulfite, ammonium bisulfite and ammonium sulfite to react with the free aldehyde; and separating the resultant modified starch therefrom.

3. Process of modifying sweet potato starch which comprises: treating the starch in a water suspension with an amount of acid to give the suspension a pH of about 1.6 to 2.5 and with about 0.075% to 0.5% of an aldehyde selected from the group consisting of formaldehyde and acetaldehyde at a temperature below the gelatinization temperature of the starch for a period of about 3 to about 6 hours; neutralizing the acid; treating the suspension with a water soluble sulfite material selected from the group of substances consisting of sodium bisulfite, potassium bisulfite, sodium sulfite, potassium sulfite, ammonium bisulfite and ammonium sulfite to react with the free aldehyde and separating the resultant modified starch therefrom.

4. Process of modifying tapioca starch for use as a gelling agent which comprises: heating the starch in suspension in water at a pH of 1.6–2.0 and a temperature of 100°–105° F. for 4–8 hours; adding to the suspension 0.155%–0.233% of dry substance formaldehyde based on the dry substance starch and heating the suspension at a temperature of 100°–105° F. for 12–20 hours; neutralizing the suspension to a pH of 5.8–6.5; filtering the suspension and re-suspending the filter cake in warm water; adding to the suspension enough sodium bisulfite to react with the free formaldehyde; filtering the suspension and washing and drying the modified starch.

5. Process of modifying sweet potato starch for use as a gelling agent which comprises: introducing into a water suspension of the starch 0.077%–0.155% of dry substance formaldehyde based on the dry substance starch and enough acid to give the suspension a pH of 1.6–2.0; heating the suspension for 3–6 hours at a temperature of 100°–105° F.; neutralizing the suspension to a pH of 6.2–6.8; filtering the suspension; re-suspending the filter cake in water; adding enough sodium bisulfite to react with the free formaldehyde; filtering the suspension and washing and drying the resultant modified starch.

6. A process of modifying tapioca starch for use as a gelling agent which comprises: adding to a water suspension of the starch acid to give the suspension a pH of 2.0–2.5, and also adding thereto 0.25%–0.335% of acetaldehyde by weight on dry substance starch; heating the material for 10–16 hours at 80°–90° F.; neutralizing the suspension to a pH of 6.3–6.7; filtering the suspension and re-suspending the filter cake in water; adding to the suspension enough sodium bisulfite to react with the free acetaldehyde; raising the temperature of the suspension to about 100° F.; filtering the suspension and re-suspending the filter cake in warm water; filtering the suspension; and washing and drying the resultant modified starch.

7. Process of modifying tapioca starch for use as a gelling agent which comprises: adding to a water suspension of the starch acid to give the suspension a pH of 1.6–2.0; heating the suspension for one-half to two hours at a temperature of 115°–125° F. to thin the starch; adding to the suspension 0.377%–0.503% of acetaldehyde based on dry substance starch; heating the material for 14–18 hours at 115° to 125° F.; neutralizing the suspension to a pH of 5.5–6.5; filtering the suspension and re-suspending the filter cake in warm water; adding to the suspension enough sodium bisulfite to react with the free acetaldehyde; filtering the suspension; and washing and drying the resultant modified starch.

8. Process of modifying tapioca starch which comprises: treating the starch in a water suspension with an amount of acid to give the suspension a pH of about 1.6 to 2.5, and with about 0.075% to 0.5% of an aldehyde selected from the group consisting of formaldehyde and acetaldehyde, at a temperature not exceeding the gelatinization temperature of the starch for a period of about 3 to about 28 hours; neutralizing the acid; treating the suspension with a water soluble sulfite material selected from the group of substances consisting of sodium bisulfite, potassium bisulfite, sodium sulfite, potassium sulfite, ammonium bisulfite and ammonium sulfite to react with the free aldehyde; and separating the resultant modified starch therefrom.

RALPH W. KERR.
NORBERT F. SCHINK.

REFERENCES CITED

The following references are of record in the file of this patent:

UNITED STATES PATENTS

| Number | Name | Date |
| --- | --- | --- |
| 405,013 | Clotworthy | June 11, 1889 |
| 969,661 | Schneider | Sept. 6, 1910 |
| 1,266,201 | Boddington | May 14, 1918 |
| 2,099,765 | Horst | Nov. 23, 1937 |
| 2,113,034 | Rowland | Apr. 5, 1938 |
| 2,222,872 | Leuck | Nov. 26, 1940 |
| 2,246,635 | Moller | June 24, 1941 |
| 2,276,684 | Kauffmann | Mar. 17, 1942 |
| 2,317,752 | Fuller | Apr. 27, 1943 |

FOREIGN PATENTS

| Number | Country | Date |
| --- | --- | --- |
| 114,646 | Australia | Feb. 19, 1943 |